United States Patent
Ronan et al.

[11] Patent Number: 6,066,264
[45] Date of Patent: May 23, 2000

[54] METHOD OF OIL-WATER SEPARATION

[75] Inventors: John J. Ronan, Kensington; Kenneth A. Perrotta, Salem; Paul E. Rebe, Bow, all of N.H.

[73] Assignee: Whatman Inc., Haverhill, Mass.

[21] Appl. No.: 09/365,292

[22] Filed: Jul. 30, 1999

Related U.S. Application Data

[62] Division of application No. 09/188,606, Nov. 9, 1998, Pat. No. 5,965,015.

[51] Int. Cl.$^7$ ............................... B01D 37/00; C02F 1/40

[52] U.S. Cl. .......................... 210/776; 210/779; 210/784; 210/799; 210/804; 210/805; 210/806; 210/167; 210/DIG. 5

[58] Field of Search ..................................... 210/799, 776, 210/779, 805, 780, 784, 800, 804, 806, 167, DIG. 5

[56] References Cited

U.S. PATENT DOCUMENTS

| | | | |
|---|---|---|---|
| 4,082,867 | 4/1978 | Henley et al. | 134/10 |
| 4,089,784 | 5/1978 | Ettelt et al. | 210/526 |
| 4,136,217 | 1/1979 | Henley | 134/10 |
| 5,015,378 | 5/1991 | Lewan et al. | 210/386 |
| 5,067,953 | 11/1995 | Lewan | 210/232 |
| 5,378,371 | 1/1995 | Hobson | 210/400 |
| 5,565,101 | 10/1996 | Kuntz | 210/304 |
| 5,582,680 | 12/1996 | Vankouwenberg et al. | 159/23 |

OTHER PUBLICATIONS

Whatman Inc., "Balston Oil Water Separators"; Bulletin PK–56A, pp. 1–8, 1996 USA.

*Primary Examiner*—Robert J. Popovics
*Attorney, Agent, or Firm*—Richard P. Crowley

[57] ABSTRACT

An oil-water separation method to separate oil-contaminated water into clean, filtered water for use. The method comprises filtering prefiltered, coalesced oil-water in an oleophobic depth-type filter.

14 Claims, 1 Drawing Sheet

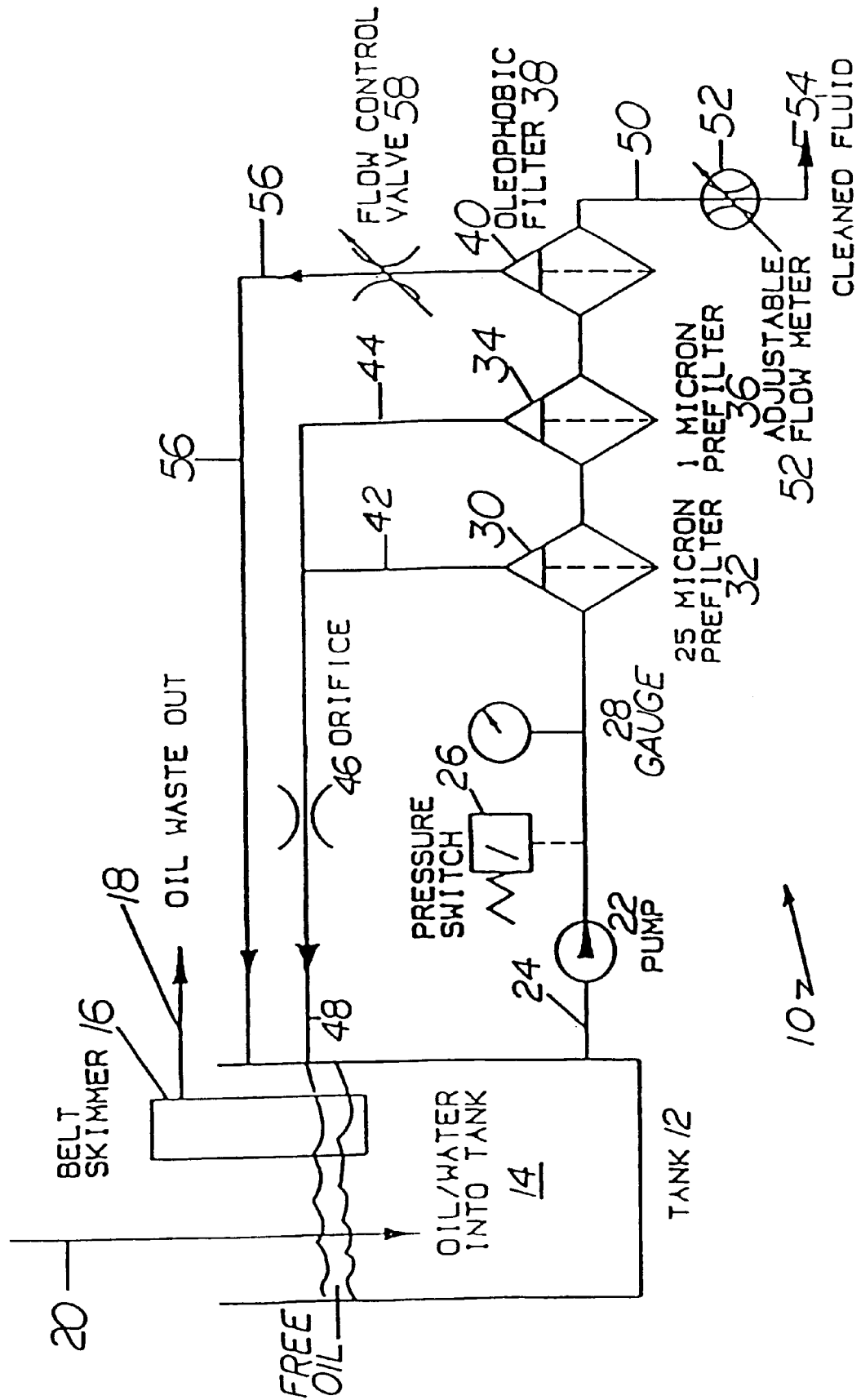

METHOD OF OIL-WATER SEPARATION

REFERENCE TO PRIOR APPLICATION

This application is a divisional application of U.S. patent application Ser. No. 09/188,606, filed Nov. 9, 1998, now U.S. Pat. No. 5,965,015, issued Oct. 12, 1999.

BACKGROUND OF THE INVENTION

Oil-contaminated water represents a significant hazardous waste problem in the industry. Oil-contaminated water is typically, but not exclusively, derived from air compressor condensants and transmission fluids; and such oil-contaminated water includes particulate material, emulsified, dissolved and free oils and metal ions which represent hazardous waste. These contaminants must be removed before the clean water may be discharged into the environment. The level of contamination permitted by government regulation varies; but typically, clean water should have less than twenty-five parts per million of oil and preferably, ten to five parts per million or lower. Metal contaminated water contains mainly petroleum, mineral, and hydrocarbon oils from a variety of industrial sources as well as chemical-type additives, such as: polyalfaolefins, diesters, glycols, polyglycols and the like, which also need to be removed prior to discharge of clean water.

Oil-water separating systems are the preferred and least costly method of treating oil-contaminated water and provide for a clean water discharge of less than twenty parts per million. Oil-water separation may be accomplished on-site; for example, by gravity carbon absorption technology, which is not wholly effective, or ultrafiltration technology, which is more effective in removing diesters, polyglycols, ETF and PAO contaminants.

One prior art commercially sold oil-water separator system which is quite effective in providing an on-site, oil-water separating system with clean water discharge, usually below twenty parts per million, comprises a system applying a combination of filters and hollow fiber membranes.

One oil-water separating system, a nanofiltration, separating, coalescing system, comprises a Balston® oil-water separator as described in Whatman Inc.'s, "Balston® Oil Water Separators"; Bulletin PK-56A, hereby incorporated by reference.

This nanofiltration system picks up free oil by a skimmer and removes continuously, the free oil from a process tank. The compressor condensate, the oil-water contaminate, is pumped into a prefiltered process tank and flows through a nanofiltration membrane module, which permits the permeation of only the water molecules to penetrate the membrane. The permeate water, virtually free of oil, is then discharged; while the unprocessed oil and water continues to flow though the hollow fiber membrane modules into a coalescing filter which transforms the emulsified and soluble oils into larger, free droplets of oils, which are then deposited into the processing tank. These larger oil droplets are then picked up by the oil skimmer which discharges the concentrated oil product from the processing tank for disposal.

While the automated, nanofiltration membrane, oil-water system is quite effective in removing a variety of contaminates, as well as particulates from contaminated oil-water, the employment of thin membrane modules are susceptible, from time to time, to oil plugging of the membrane surface; and further, the sheet or hollow fiber membrane is often very fragile, as well as being subject to oil flow blockage.

It is therefore desirable to provide for a new and improved oil-water separator automated system to provide for the continuous discharge of clean water from oil-contaminated water.

SUMMARY OF THE INVENTION

The invention relates to a oil-water separator system and method, and particularly to a continuous, coalescing oleophilic, filtered oil-water system to treat oil-contaminated water and to a method of producing and providing clean water.

The oil-water separator system and method of the invention employs coalescing filter technology, combined with a depth-type oleophobic filter element in the system. The oil-water system represents an improvement in the system and method of the prior art, in that an oleophobic, fibrous filter system is employed rather than a nanofiltration membrane, which significantly reduces the plugging of the nanofilter and avoids difficulties concerning the employment of fragile membranes in an oil-water system.

In addition, the improved system permits the employment of back pressure in a depth-type, oleophobic filter element and permits the flow of the oil-water from the outside to the outside walls of the oleophobic, depth-type filter, thereby providing for the main flow of the oil-water to pass the oleophobic filter, which is constantly sweeping the outside filter wall to remove any oil which may become trapped on the filter surface, therefore reducing the plugging of the filter and the replacement of the filter in use.

The oil-water separator system pumps oil and water from a processing tank through coalescing filters, typically one or a plurality of coalescing filter stages, which coalescing filters; for example, a first and second stage in a filter housing create large oil droplets that float to the top surface of the filter housing and are then returned to the process tank wherein the free oil in the tank from the top of the process tank is removed by a belt skimmer.

The contaminated oil-water, after passing through the first and second coalescing filters, flows through a fibrous, depth-type; e.g., ⅛ to ½ inch, oleophobic filter module which acts as a barrier to the oil and the remaining oil-water stream. The oleophobic, depth-type filter permits only clean water to pass to the oleophobic filter, so that the remaining oil and water in the stream, which represents the main flow, acts as a sweeping flow outside the outside walls of the depth-type filter, which sweeping flow is returned to the process tank where it will again go through the processing and oleophobic filters in a continuous automatic system. The clean water removed from the oleophobic, depth-type filter; typically having less than ten parts per million (ppm), is discharged and typically drained down the sewer. The oil-water system repeats this process until the processing tank volume is depleted.

The purpose of the oil-water separator is to take oil-contaminated water containing oil contaminates and particulates, and remove the majority of the contaminating oil components, such that water with 10 to 20 ppm or lower level of oil may be discharged. Thence, in the case of compressor condensate, such as an oil-water contaminate, the oil comprises only two to three percent of the condensate, the rest of the oil-water stream being water, so that 97 to 98 percent of the water can be removed from the oil and discharged down the sewer. Thus, a customer need only pay for the disposal of the collected oil removed from the processing tank by the belt skimmer, and therefore, considerably reduce the waste cost.

The invention comprises an oil-water separator system, which comprises a processing tank to receive and contain therein contaminated oil-water to be separated from a variety of sources and a pump, such as a low shear pump, to pump the received oil-water in the processing tank from the tank.

The system includes a coalescing filter means, typically in a plurality of serial stages, such as a first and a second stage, each stage in a separate filter housing; for example, the first coalescing filter stage coalescing above 25 microns, while the second stage coalesces down to one micron or lower. The coalescing filtering means removes the particulates in the pumped contaminated oil and coalesces the oil to provide a coalesced oil stream and a filtered oil-water stream, while permitting the coalesced oil from the filter to rise to the top of each of the filter housings. The system includes a conduit means to discharge the coalesced oil from each of the filter housings back into the process tank.

The system includes a depth-type, oleophilic, fibrous filter means and a filter housing to receive the filtered oil-water from the coalescing filter means, and which oleophobic filter means permits substantially only the passage of clean water; thus recovering permeated clean water to be discharged, while the main portion of the coalesced oil-water stream and the oil contained therein is repelled by the oleophobic filter, and collects at the top of the oleophobic filter housing, and is then returned to the process tank for continuous recycle.

The system includes a second conduit means to discharge the main, flow-through, repelled oil-water stream from the oleophobic filter means back into the processing tank. Optionally, but preferably, the system includes a flow control valve in the second conduit means to control the flow of the repelled oil-water stream from the oleophobic filter housing into the processing tank, and to provide back pressure on the upstream side of the depth-type, fibrous, oleophobic filter means to aid the oil-stream in permeating water through the oleophobic, depth-type filter means.

The system also would include a flow meter to monitor the clean or permeated water from the oleophobic filter means to ensure compliance with statutory or government regulations as to the level of water and the means to discharge the permeate water, typically into the sewer.

The system includes a free oil removal means in the process tank, and generally includes a glass fiber or polymeric fiber skimmer belt operating on a timer which picks up free oil on the surface in the processing tank and discharges free oil from the processing tank for collection and removal. The free oil picked up by the belt skimmer is scraped off the belt and placed in a trough for collection and discharge.

Typical coalescing filters which are employed in the system would include glass fiber, randomly disposed, resin-bound cylindrical filters, each within a filter housing, and each filter designed to remove a particular level of particulates and to coalesce a particular micron level of the oil-water stream. While a single coalescent filter may be employed; typically and preferably, first, second or even third coalescing and particulate removing filters are usually employed in series to provide a coalesced filter, oil-water stream to the oleophobic filter.

The oleophobic filters in a filter housing include one or more oleophobic filter modules, and include fibrous, typically glass fibers; randomly disposed; resin-bound; generally fluorocarbon resin-bound, depth-type; glass fiber filters, which under back pressure, permit only clean permeate water to pass through the oleophobic filter and to be discharged as clean permeate water, while the remaining coalesced oil-water stream is removed from the filter housing and returned to the processing tank for reprocessing.

Generally, and preferably, the depth-type oleophobic filter would comprise a glass fiber fluorocarbon; such as a TEFLON resin binder and TEFLON-coated glass fiber filter; such as permits, for instance, removing to a level of between 1.0 microns and 0.1 micron or even lower (TEFLON® is a registered trademark of E. I. du Pont de Nemours & Co. for tetrafluoroethylene polymers).

This depth-type, glass fiber, fluorocarbon, resin-bound filter can reduce the tendency to experience surface plugging, since while some of the surface may be plugged with oil, there is still sufficient open surface remaining, so that the flow is not significantly reduced; while additionally, the employment of back pressure and the sweeping of a major portion of the coalesced, oil-water stream running through the outside of oleophobic, fibrous filter significantly reduces any plugging; while the oleophobic part of the filter-like membranes is not fragile and permits outside to outside flow through the filter.

The oil-water separator system and method will be described for the purposes of illustration only in connection with certain embodiments; however, it is recognized that various changes, modifications, additions and improvements to the illustrated system and method may be made by those persons skilled in the art without departing from the spirit and scope of the present invention.

BRIEF DESCRIPTION OF THE DRAWING

The drawing is a schematic, illustrated, oil-water separator system of the invention for the continuous and automatic treatment of oil-contaminated water.

DESCRIPTION OF THE EMBODIMENTS

The drawing shows an oil-water separator system 10 for the separating of oil-contaminated water, such as a compressor's condensants in a processing tank 12, the oil-water 14 introduced into the open top of the tank 12 through line 20.

The process tank 12 includes a timed, geared belt skimmer 16 which picks up free oil from the surface of the processing tank 12 and discharges the collected oil 18 for removal. Typically, the belt skimmer 16 comprises an olefinic material belt which includes a scraper to scrape the collected oil from the belt surface for removal and collection.

The system 10 includes a low shear, low agitation pump 22 which removes contaminated oil-water from the process tank 12 through a conduit 24, which contains a pressure switch 26 and a pressure gauge 28, and introduces the oil-contaminated water 14 for separation into a first stage filter housing 30 containing therein a glass fiber, resin-bound, first stage, 25 micron prefilter 32 which removes particulates and coalesces the oil. The housing 30 is inverted, as illustrated, so as the coalesced oil rises to the top of the housing 30, and under pressure, flows back to conduits 42 and 48 into the process tank 12.

The oil-water 14 passes through the first stage prefilter 32, into the housing 34, which contains prefilter 36, where second stage filtration by the one micron prefilter 36 also removes particulates and coalesces the oil in the oil-water streams further.

The housing 34 is inverted, so that the coalesced oil rises to the top of the housing 30 and flows back into the tank 12 through conduits 42 and 44. A drain conduit line 48 has an orifice 46 to force most of the flow through the filter by back pressure, while allowing continuous removal of coalesced oil from the top of filter housings 30 and 34.

The oil-water stream is removed from filter housing 34 and prefilter 36, and sent to a oleophobic filter 38 within housing 40, which is also inverted.

The oleophobic filter 38 comprises a glass filter with TEFLON-coated fibers and has a 1.0 to 0.1 micron filter. The oleophobic filter 38 has a clean water discharge conduit 50 and an adjustable flow meter 52 which monitors the amount of permissible oil in the clean water. The clean fluid 54 is then discharged, typically to a sewer, after compliance with statutory regulations, generally of 10 ppm or lower. The oleophobic filter 38 repels any oil in the oil-water stream from the first and second stage and allows water to pass through the depth of the filter. The main flow of the oil-water 14 passes outside and through the filter 38, constantly sweeping the outside walls and removing any oil which may have become trapped on the oleophobic filter 38 surface. The oleophobic filter discharge return conduit 56 includes a flow control valve 58 which is adjustable and creates pressure upstream, on the outside of the oleophobic filter 38 in the housing 40, which back pressure forces some water through the oleophobic filter 38, and the main portion of the stream returns through conduit 56 into the process tank 12, wherein free coalesced oil collects on the upper surface and is removed by the belt skimmer 16 to the oil discharge conduit 18.

The system therefore provides for an efficient, low cost, effective, on-site, oil-water separator system and method employing a fibrous, full depth, oleophobic filter which operates under back pressure and provides for the continuous, automatic removal, by filtering and coalescing of oil from a contaminated oil-water source, for the collection of coalesced oil and the discharge of clean water to the sewer.

The operation of the system provides for contaminated oil-water to be pumped through inlet 20 into process tank 12 from an oil-water contamination source. The oil-water 14 is drawn through a low shear, low agitation pump 22 and conduit 24 and forced through a first stage filtration of 25 micron prefilter 32, and thereafter a one micron prefilter 36 both with inverted housings. Coalesced oil from housings 30 and 34 is removed through lines 42, 44 and 48, and returned back to the process tank 12. The stream from the first and second filter stages 32 and 36 is then sent into the oleophobic depth-type filter housing 40, and an oleophobic filter 38 which serves as a barrier to the remaining oil in the stream. The remaining oil-water stream flows from outside the oleophobic filter 38, to the drain port, through line 50 and adjustable flow meter 52, and the clean water 54 is discharged. The main flow from the oleophobic filter housing 40 passes through adjustable flow valve 58, which provides controlled back pressure to oleophobic filter 38 through line 56, and then returns continuously coalesced oil-water to process tank 12 for further recycling.

What is claimed is:

1. An oil-water separation method to separate contaminated oil-water in a process tank into filtered clean water and coalesced free oil, which method comprises:

a) prefiltering the contaminated oil-water from the process tank in a prefilter to remove particulate material and recycling any coalesced free oil from the prefilter to the process tank;

b) filtering the prefiltered oil-water in a depth fibrous oleophobic filter under back pressure;

c) sweeping the prefiltered oil-water about the outside surface of the oleophobic filter to prevent free oil from plugging the oleophobic filter;

d) withdrawing filtered clean water from the interior of the oleophobic filter;

e) recycling the swept oil-water from the oleophobic filter, with coalesced free oil returning back to the process tank; and f) removing coalesced free oil on the surface of the oil-water in the process tank.

2. The method of claim 1 which includes filtering the oil-water in a glass fiber, fluorocarbon, resin-bound cylindrical filter.

3. The method of claim 1 which includes filtering the oil-water through an oleophobic filter having a filter range of about 0.1 to 1 micron.

4. The method of claim 1 which includes discharging clean water having about 20 ppm oil or less.

5. The method of claim 1 which includes removing the coalesced oil layer, by collecting the oil on a moveable belt surface, and removing from the belt surface, the collected oil outside of the process tank.

6. The method of claim 2 which includes employing a flow control valve to control oil-water flow and to place back pressure on the oleophobic filter.

7. The method of claim 2 which includes employing an inverted housing for the oleophobic filter and removing oil-water and coalesced free oil from the top of the inverted housing.

8. The method of claim 2 which includes monitoring the flow and concentration of oil in the filtered clean water.

9. The method of claim 2 which includes pumping the oil-water employing a low sheer pump.

10. The method of claim 2 which includes employing a downstream orifice to force oil-water through the prefilter.

11. The method of claim 2 which includes introducing contaminated oil-water into the process tank for separation.

12. The method of claim 2 which includes prefiltering the oil-water in a first stage prefilter of about 25 microns or above and a second stage prefilter of about 1 micron.

13. The method of claim 2 wherein the prefilter comprises a glass fiber, resin-bound cylindrical filter.

14. The method of claim 2 which includes recycling the coalesced free oil from the prefilter and recycling the swept oil-water from the oleophobic filter to the process tank employing separate recycling conduits.

* * * * *